(12) United States Patent
Desai (10) Patent No.: US 6,773,154 B2
(45) Date of Patent: Aug. 10, 2004

(54) AUTOMOTIVE LIGHTING DEVICE (75) Inventor: Deval M. Desai, Farmington Hills, MI (US)

(73) Assignee: North American Lighting, Inc., Farmington Hills, MI (US)

( * ) Notice: Subject to any disclaimer, the term of this patent is extended or adjusted under 35 U.S.C. 154(b) by 3 days.

(21) Appl. No.: 10/224,710

(22) Filed: Aug. 21, 2002

(65) Prior Publication Data

US 2004/0037087 A1 Feb. 26, 2004

(51) Int. Cl.[7] .............................. B60Q 1/26; F21V 29/00
(52) U.S. Cl. ...................... 362/541; 362/294; 362/373; 362/547; 362/800
(58) Field of Search ................. 362/294, 345, 362/373, 540, 541, 542, 545, 547, 800

(56) References Cited

U.S. PATENT DOCUMENTS

| | | | |
|---|---|---|---|
| 4,274,217 A | 6/1981 | Ohshima | 40/451 |
| 4,336,580 A | 6/1982 | Mouyard et al. | 362/347 |
| 4,733,335 A * | 3/1988 | Serizawa et al. | 362/545 |
| 4,811,179 A | 3/1989 | Komatsu et al. | 362/256 |
| 4,967,330 A * | 10/1990 | Bell et al. | 362/373 |
| 5,015,918 A | 5/1991 | Copeland | 315/76 |
| 5,101,454 A | 3/1992 | Blonder et al. | 385/14 |
| 5,197,792 A | 3/1993 | Jiao et al. | 362/31 |
| 5,434,754 A | 7/1995 | Li et al. | 362/31 |
| 5,567,036 A | 10/1996 | Theobald et al. | 362/80 |
| 5,592,578 A | 1/1997 | Ruh | 385/31 |
| 5,947,592 A * | 9/1999 | Barlow | 362/345 |
| 6,099,156 A | 8/2000 | Jenkins et al. | 362/511 |
| 6,220,722 B1 * | 4/2001 | Begemann | 362/294 |
| 6,280,480 B1 | 8/2001 | Tuttle et al. | 632/518 |
| 6,371,636 B1 * | 4/2002 | Wesson | 362/545 |
| 6,461,024 B1 * | 10/2002 | Becker et al. | 362/545 |
| 6,478,453 B2 * | 11/2002 | Lammers et al. | 362/294 |
| 2003/0063476 A1 * | 4/2003 | English et al. | 362/545 |

* cited by examiner

*Primary Examiner*—Alan Cariaso
(74) *Attorney, Agent, or Firm*—McDonnell Boehnen Hulbert & Berghoff (57) ABSTRACT

An exterior automotive lighting device is provided. The device includes a light guide housing and a single Light Emitting Semiconductor Device (LESD). The light guide housing includes reflective material and optical elements to reflect emitted photons from the single LESD in multiple directions. The light guide has a thermally conductive material and thermally conductive connectors to dissipate heat generated by the single LESD. The lighting device may be used in accordance with lighting systems, such as a high mount stop lamp and a tail lamp on an automobile.

19 Claims, 5 Drawing Sheets

AUTOMOTIVE LIGHTING DEVICE

FIELD OF INVENTION

The present invention relates to automotive lighting devices, and more particularly, to employing a single Light Emitting Semiconductor Device (LESD) in lighting devices for exterior automotive lighting applications.

BACKGROUND OF INVENTION

Exterior automotive lighting, such as tail lights and brake lights, has typically been accomplished using incandescent light bulbs mounted in specifically designed lighting fixtures. Incandescent light bulbs provide a necessary light intensity required by law for use in automotive lighting applications. However, incandescent light bulbs have drawbacks. For example, incandescent light bulbs have poor power use efficiency, and a short lifetime expectancy. As an alternative to incandescent light bulbs, Light Emitting Diode (LED) lamps have also been used in tail lights and brake lights in vehicles such as, cars, motorcycles, forklifts, ATVs, trailers, and other motor vehicles. LEDs can be designed to maximize brightness and fill an entire area of a light fixture according to a desired application.

LED lamps offer advantages in comparison to incandescent light bulbs. LED lamps offer reliable performance, which represents reduced repairs, reduced maintenance, and therefore reduced costs. In addition, LED lamps promote safe motor vehicle driving due to faster turn-on times than conventional incandescent signal lamps. For example, LED lamps within a tail lamp of a vehicle increase an amount of response time available for motorists. Typical LED lamps operate approximately 0.2 seconds faster than incandescent light bulbs, which approximately results in an additional 19 feet of response time at a speed of 65 miles per hour for a trailing vehicle (i.e., distance traveled, 19 feet=(65 mile/hour)(5280 feet/mile)(1/3600 hour/sec)(0.2 sec.)).

LED lamps also consume less power than incandescent bulbs. Typically, LED lamps operate using approximately 10%–20% of an amount power consumed by incandescent light bulbs. The reduced power consumption presents both a manufacturer and vehicle owner with potential cost savings and design options such as reducing the size of an alternator, using lighter gauge wire for an automotive electrical system, or other power reduction options. In addition, LED lamps generate less heat than an incandescent bulb resulting in illuminated fixture panels that are cool-to-the-touch unlike those illuminated by incandescent lamps. A typical LED lamp provides an intense beam of colored light. The intensity and wavelength can remain stable over the LED lamps lifetime of approximately 100,000 or more hours, which is approximately 30–50 times longer than typical incandescent light bulbs.

State laws require specified light outputs for exterior automotive lighting applications, such as tail lamps. For example, in Illinois, it is required by law for automotive vehicles to possess headlights showing a white visible light discernable at a distance of at least 1000 feet, tail lamps showing a red visible light discernable at a distance of at least 500 feet, and a lamp to illuminate a rear registration plate with a white light in order to render the plate clearly legible from a distance of at least 50 feet from the rear of the vehicle. Exiting LED lamps used today employ a large amount of LEDs mounted on supports, and a corresponding number of optical arrangements mounted within the lamp, each disposed over a corresponding power source to obtain these required photometric characteristics.

In addition, typical LED light fixtures comprise numerous LEDs arranged to direct light through a light fixture. For example, a typical fixture may contain six LEDs arranged perpendicular to a lamp base in order to radiate light onto a light fixture reflector and illuminate an entire surface of the fixture. A fixture of this configuration may provide a total light output of approximately 100 Footcandles (i.e., 1 Foot candle=1 lumen/sq-ft, which is the illumination from 1 standard candle at 1 foot range). Still other existing designs may use more than 6 LEDs, and/or any number of LEDs to fulfill output requirements.

Existing solutions using LED lamps for exterior automotive lighting require a lamp design to accommodate a number of LEDs, further complicated by a heat management solution that is required to dissipate heat generated by the large number of LEDs present within a system. Such a device has thermal and packaging problems due to the large number of LEDs necessary for the required output and operation of the device. Existing LED lamps that utilize multiple LED light sources to fulfill light output requirements are difficult to manufacture due to a complexity of a light fixture design.

Consequently, an exterior automotive lighting device that has a light source that does not have these optical and thermal problems is desirable. In addition, it is desirable to provide an exterior lighting device with a structure that may be manufactured and maintained at low costs.

SUMMARY OF INVENTION

In view of the above, some of the problems associated with providing an exterior automotive lighting device are overcome. In one embodiment, a lighting device is provided that has a light guide and a light source that is a single Light Emitting Semiconductor Device (LESD). The single LESD is coupled to the light guide to radiate light through a first surface. The lighting device further has a control circuit is electrically coupled to the single LESD to control operation of the single LESD and a heat collector to dissipate heat generated by the single LESD and the control circuit.

In another embodiment, an exterior vehicle lamp is provided that has a lens and a reflector coupled together comprising a light guide. A single Light Emitting Semiconductor Device (LESD) is mounted within the light guide. The single LESD may be mounted within the light guide using a thermally conductive connector that is operable to dissipate heat generated by the single LESD.

In still another embodiment, a method of managing heat generated within a lighting device is provided including providing a lighting device that has a first surface and a second surface composed of a thermally conductive substrate material. The lighting device also has a single Light Emitting Semiconductor Device (LESD) operable to radiate light and a control circuit mounted between the first surface and the second surface of the lighting device electrically coupled to the single LESD to control operation of the single LESD. The method further includes providing an air channel between the first surface and the second surface of the lighting device and transferring heat generated by the single LESD and the control circuit through the air channel of the lighting device thereby uniformly distributing heat throughout the lighting device.

The lighting device of embodiments of the present invention may provide an exterior automotive lighting device that has a light source comprising a single LESD. The single LESD preferably complies with photometric requirements of automobile lighting devices. A heat management system is also provided to reduce heat flow problems present within existing automotive lighting devices.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached figures, wherein like reference numerals refer to like elements in the various figures, and wherein.

DETAILED DESCRIPTION OF EXEMPLARY EMBODIMENTS

Figure 1:
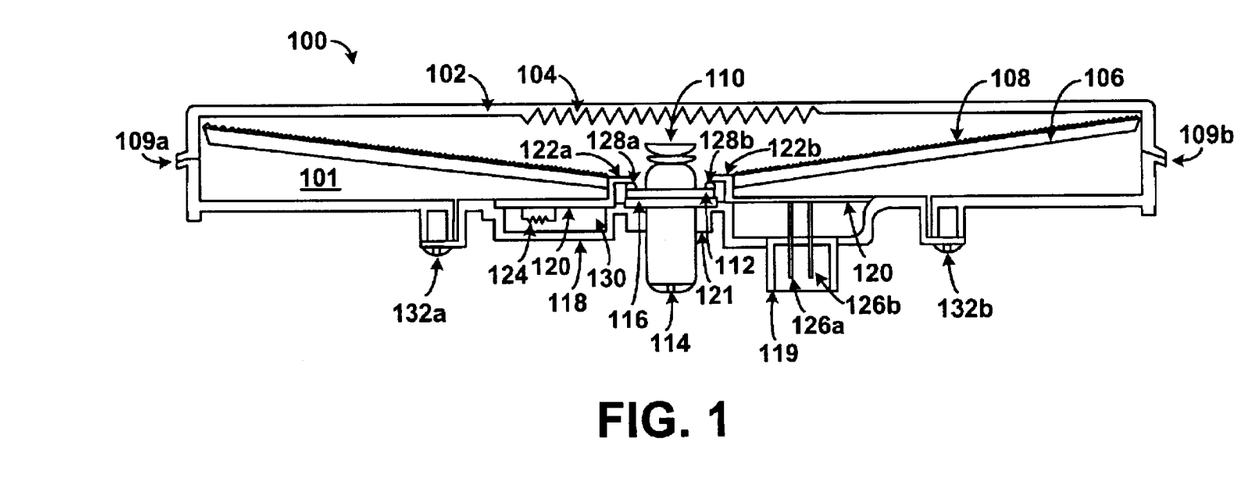
FIG. 1 illustrates a side view of one embodiment of a lighting device.

FIG. 1 illustrates a side view of one embodiment of an exterior automobile lighting device. It should be understood that the lighting device illustrated in FIG. 1 and other arrangements described herein are set forth for purposes of example only, and other arrangements and elements can be used instead and some elements may be omitted altogether, depending on manufacturing and/or consumer preferences.

By way of example, FIG. 1 illustrates a high mount stop lamp 100. The high mount stop lamp 100 comprises a light guide 101 which has a lens 102 and a reflector 106. The lens has retroactive optics 104 on an inner surface to direct light in multiple directions, and to hide a view of components of the light guide 101. The retroactive optics 104 receive radiated light and distribute the light in a plurality of directions. The light guide 101 may also include an outer lens (not shown) coupled to the light guide 101 to receive radiated light from the lens 102 and to further reflect the radiated light in a desired direction.

The lens 102 has a thickness that may be specified due to manufacturing and/or design constraints. The reflector 106 has steps 108 throughout an outer surface of the reflector 106. The steps 108 reflect light rays and/or emitted photons substantially perpendicular to an incident direction of the emitted photons. Connectors 109(a–b) are provided on each side of the lens 102 to couple the lens 102 with a back plate 118. A single Light Emitting Semiconductor Device (LESD) 110 is mounted within the high mount stop lamp 100 on a metal core base 112. A stud bolt 114 with a shoulder 116 is assembled to the back plate 118 of the light guide 101 to secure the single LESD 110 into place.

A circuit board assembly 120 with contacts 122(a–b), a resistor 124, and terminals 126(a–b) is mounted within the back plate 118. The back plate 118 is provided with a connector 119 and a center section 121. The connector 119 allows for placement of a socket plug to deliver electrical power to the single LESD 110. The center section 121 allows for placement of the single LESD 110. The resistor 124 may be a current-limiting resistor to provide protection for the single LESD 110. The circuit board assembly 120 may also contain polarity-protection diodes and/or other additional electrical components to provide supplementary circuitry protection.

The high mount stop lamp 100 of FIG. 1 is an exterior automotive lighting device employing a single LESD as a light source to direct light to the rear of an automobile. In one embodiment, the single LESD is a Light Emitting Diode (LED). The LESD may comprise a semi-conductor chip located in a center of a lamp structure containing two regions separated by a voltage regulated junction. The LESD emits photons when a sufficient voltage is applied across leads of the LESD. The LESD may have semiconductor material operable to emit light by a transition of electrons between energy levels. Employing an exterior automotive lighting device with a single LESD allows use of fewer diodes while maintaining a light intensity required by law. For example, the single LESD 110 of the high mount stop lamp 100 illustrated in FIG. 1 may emit photons in front and to the sides of the single LESD 110 providing a desired light distribution. The use of a single LESD in an exterior automotive lighting device may also conform to manufacturing and design constraints of a small package space.

The single LESD 110 of the high mount stop lamp 100 illustrated in FIG. 1 is mounted into the light guide 101 using the stud bolt 114 to secure the single LESD 110 into the back plate 118. The metal core base 112 of the single LESD 110 is positioned on the shoulder 116 of the stud bolt 114 to provide thermal conductivity. The circuit board 120 is then mounted to the back plate 118 such that the contacts 122 (a–b) couple to solder points 128 (a–b) of the single LESD 110. The resistor 124 is positioned in an air channel 130 of the back plate 118. The air channel 130 is formed between the back plate 118 and the circuit board 120. The air channel is a passageway for heat to flow through. The terminals 126 (a–b) of the circuit board 120 are engaged in the molded connector 119 of the back plate 118. The back plate 118 assembly comprising the single LESD device 110, the circuit board 120, and the stud bolt 114, is then assembled to the reflector 106 by screws 132 (a–b).

Figure 2:
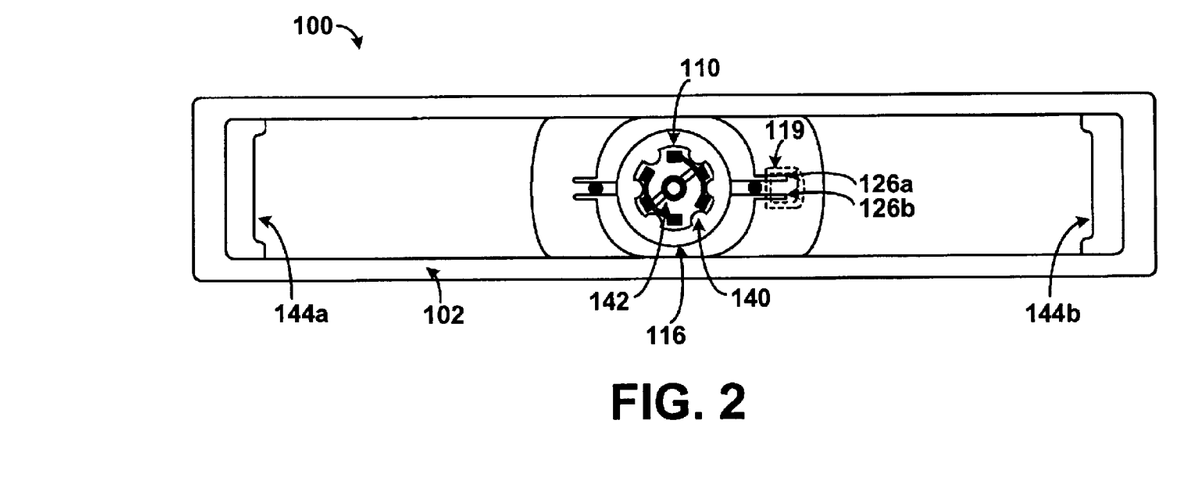
FIG. 2 illustrates a front view of the lighting device of FIG. 1.

FIG. 2 is a front view of the high mount stop lamp 100 of FIG. 1. The metal core base 112 of the single LESD 110 has slots 140 that assist in inserting the single LESD 110 into the back plate 118. The slots 140 line up with molded features and indentures of the back plate 118. Circuitry 142 of the single LESD 110 is also illustrated in FIG. 2. Such circuitry 142 includes a chip located in the center of the single LESD 110 structure containing two regions separated by a voltage regulated junction. Side reflector optics 144(a–b) are also provided to reflect emitted photons in desired directions. When inserted, the single LESD 110 emits photons in a plurality of directions.

Figure 3:
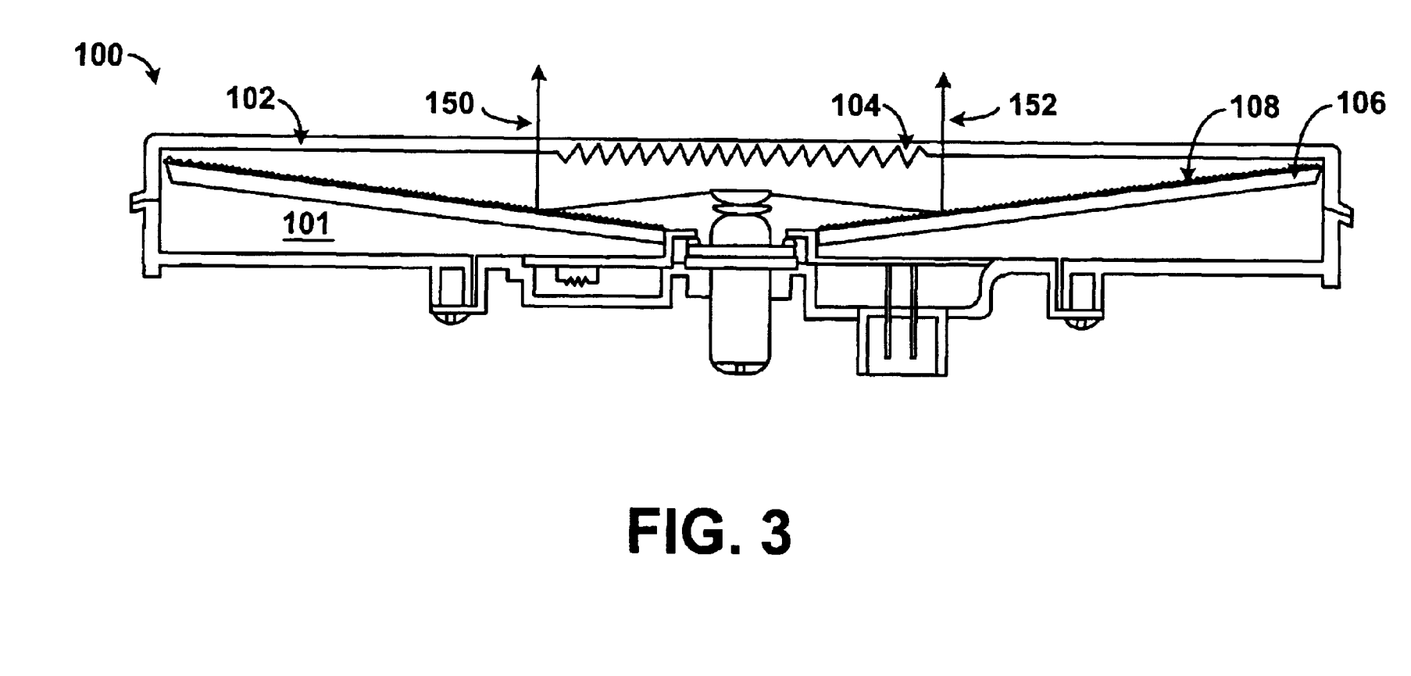
FIG. 3 illustrates a light distribution of the lighting device of FIG. 1.

FIG. 3 illustrates a light distribution of the high mount stop lamp 100 of FIG. 1. Photons may radiate from the top and/or from sides of the single LESD 110. An emitted photon 150 radiated from the single LESD 110 may contact the steps 108 of the reflector 106 and may be reflected outward in a direction substantially perpendicular to the incident direction of the first emitted photon 150. Another photon 152 may also be emitted and may contact the steps 108 as well and be reflected outward.

The circuit board 120 of the high mount stop lamp 100 includes a control circuit to operate the single LESD 110 and/or control emission of photons from the single LESD 110. A signal generator (not shown) may also be provided coupled to the control circuit to generate signals to operate the single LESD 110. The control circuit receives the signals generated by the signal generator to control operation of the single LESD 110. In one embodiment, the signal generator is controlled by a driver of an automobile and may be a switch or a brake pedal used in accordance with a braking system of an automobile.

Figure 4:
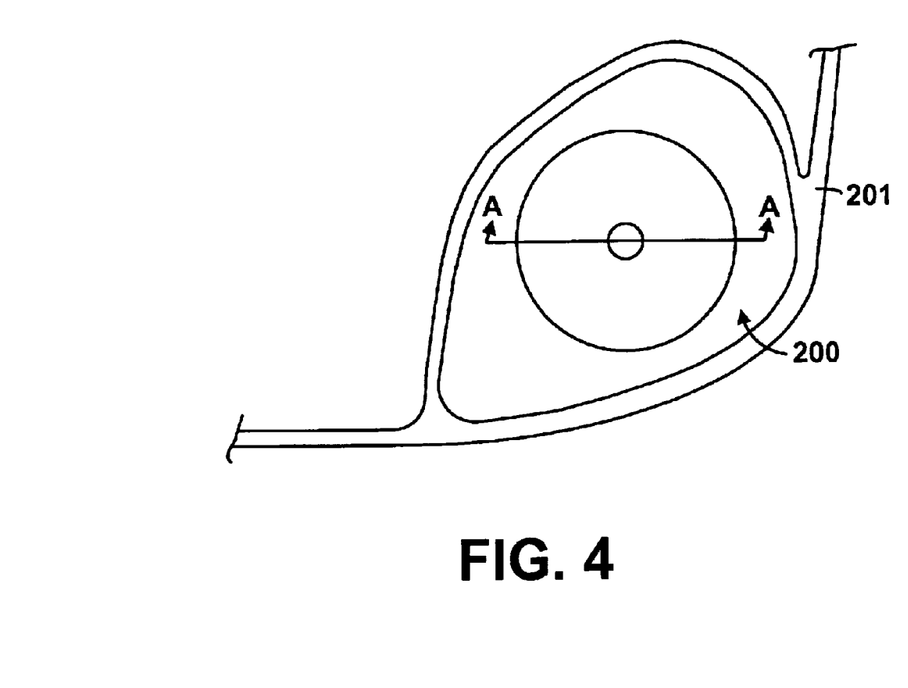
FIG. 4 illustrates a rear view of a portion of a vehicle.
Figure 5:
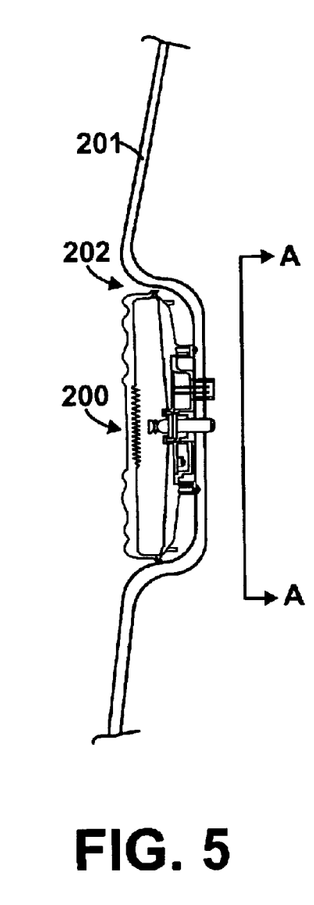
FIG. 5 illustrates a side internal view of the portion of the vehicle illustrated in FIG. 4.

Referring to FIG. 4, a rear view of a portion of a vehicle is illustrated. The vehicle includes an outline 201 which may comprise a fender, a bumper, a hood, and/or other exterior components of a vehicle. The outline 201 provides a housing for a lighting device, such as a tail lamp 200. FIG. 5 illustrates a side internal view of the portion of the vehicle illustrated in FIG. 4 along a section indicated by arrows A. The tail lamp 200 may be configured to be positioned within a recess 202 of the vehicle outline 201. A traditional tail lamp may require a much larger recess to hold the lamp than the recess 202 required to hold the tail lamp 200 because traditional tail lamps employ either incandescent light bulbs or numerous LED lamps. The configuration of the tail lamp 200 allows for a substantial amount of space to be saved within the vehicle outline 201.

Figure 6:
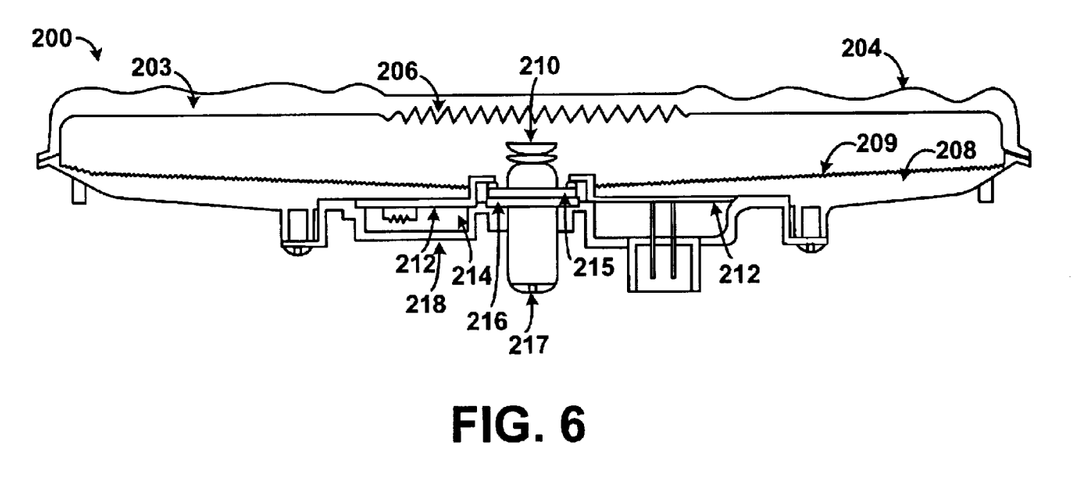
FIG. 6 illustrates a side view of one embodiment of a lighting device.

FIG. 6 illustrates a side view of the tail lamp 200. The components of the tail lamp 200 are similar to the components of the high mount stop lamp 100. A lens 203 of the tail lamp 200 comprises a substrate material that has optical elements 204 on an outer surface of the lens 203 to aid in directing the radiated emitted photons in an outward direction. The lens 203 also includes optics 206 on an inner surface of the lens 203. The optical elements 204 and optics 206 may be step features, Fresnel optics, reflective surfaces, or other optical features to direct emitted photons in a desired direction. The tail lamp 200 also includes a reflector 208 having step features 209 to direct light in a desired direction. A single LESD 210 is mounted within a center section of the tail lamp 200 using a stud bolt 217. The stud bolt 217 includes a metal core base 215 and a shoulder 216. A circuit board 212 is mounted within a base plate 218 of the tail lamp 200 and conductively coupled to the circuit board 212. An air channel 214 is present between the circuit board and the base plate 218 of the tail lamp 200 providing a passageway to dissipate heat generated by the single LESD 210.

Figure 7:
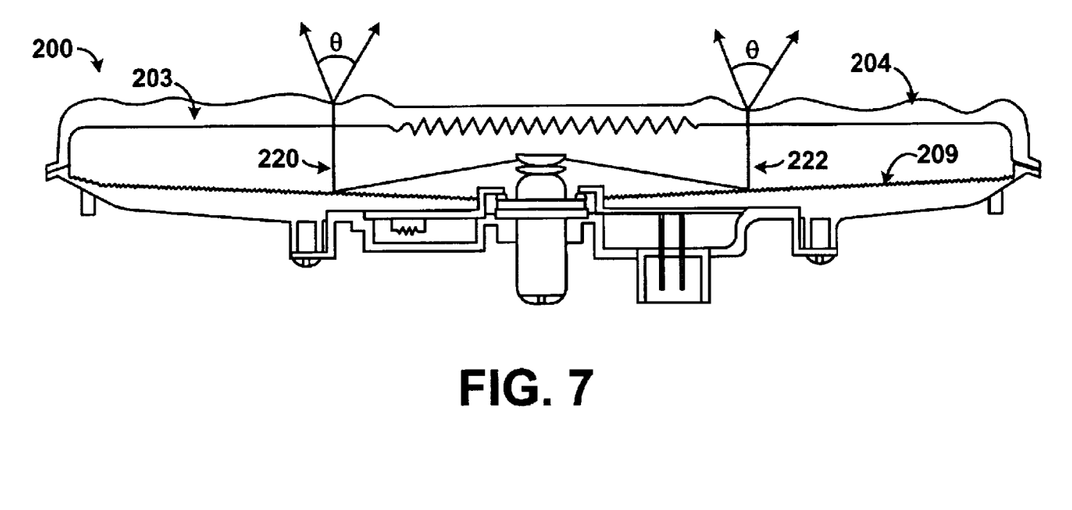
FIG. 7 illustrates a light distribution of the lighting device of FIG. 6.

FIG. 7 illustrates a light distribution of the tail lamp 200 of FIG. 6. Emitted photons radiated from the single LESD 210 may be reflected out of the tail lamp 200. A first emitted photon 220 radiated contacts the steps 209 of the reflector 208 and is reflected outward in a direction substantially perpendicular to the incident direction of the first emitted photon 220. In addition, the first emitted photon 220 will contact the optical elements 204 of the lens 203 and will be reflected in multiple directions as shown according to a side light distribution angle θ. The side light distribution angle θ is dependent upon the size, shape, and type of the optical elements 204. A second emitted photon 222 contacts the steps 209 as well, and the second emitted photon 222 is also reflected outward as shown according to the side light distribution angle θ.

Figure 8:
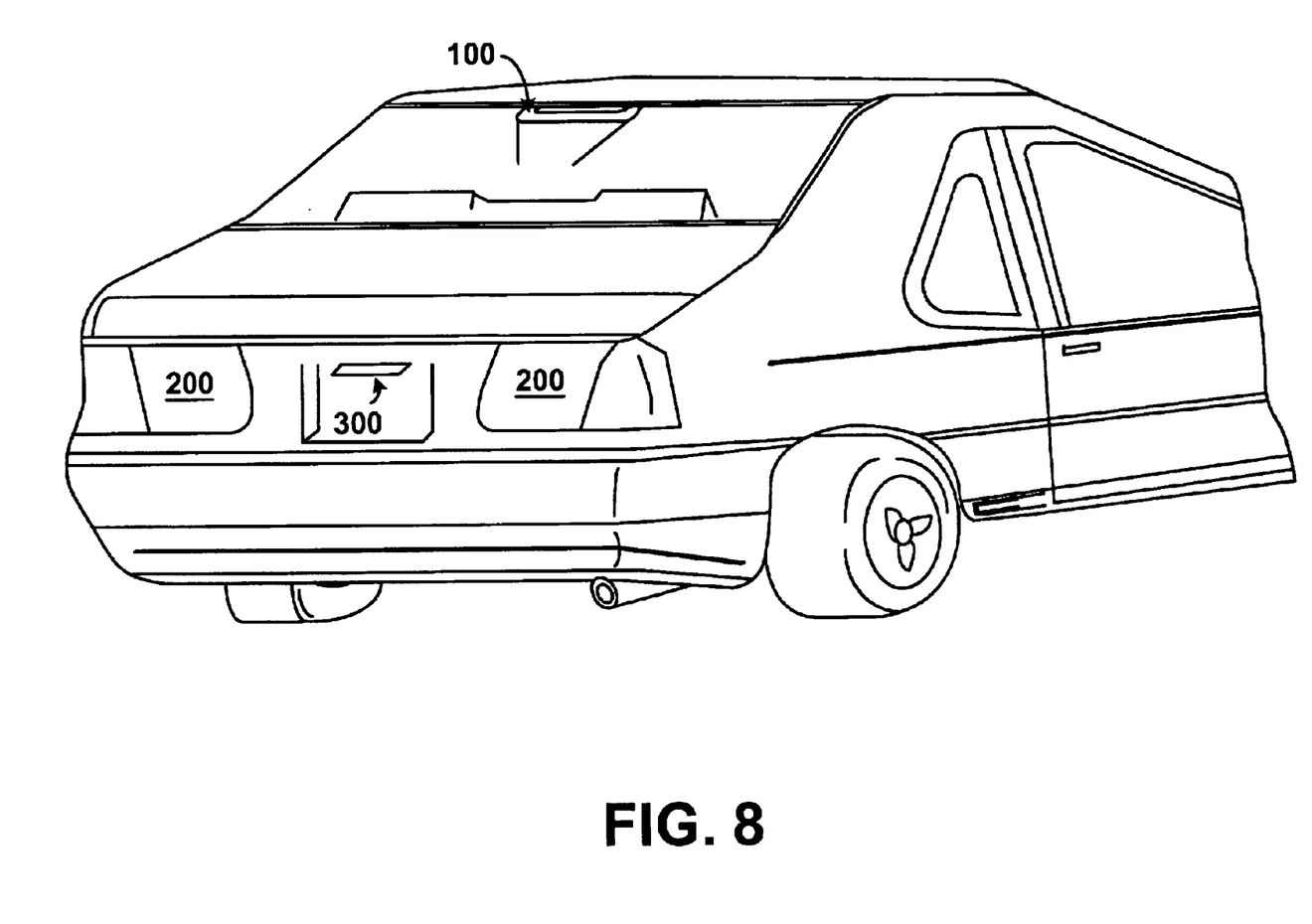
FIG. 8 illustrates the lighting devices of FIG. 1 and FIG. 6 arranged in a lighting system.

FIG. 8 illustrates the high mount stop lamp 100 and tail lamp 200 arranged in a lighting system. The high mount stop lamp 100 and the tail lamp 200 are coupled to a power source (not shown) which provides electrical power to the single LESDs 110 and 210 of the high mount stop lamp 100 and tail lamp 200. Within the lighting system illustrated in FIG. 8, the power source is preferably an automobile battery.

The high mount stop lamp 100 is shown mounted at the top of a rear window of an automobile. The tail lamp 200 is also shown mounted on each side of the rear of the automobile. The high mount stop lamp 100 and the tail lamp 200 are used in accordance with a braking system of an automobile. The high mount stop lamp 100 or the tail lamp 200 may also be configured as a license plate number lamp 300, which is illustrated mounted above a license plate.

The single LESD 110 of the high mount stop lamp 100 or the single LESD 210 of the tail lamp 200 preferably meet a required light output. The single LESDs 110 and 210 may generate heat by emitting photons. The high mount stop lamp 100 and the tail lamp 200 preferably, but not necessarily, include heat collecting devices to manage heat generated throughout the lighting devices.

In one embodiment, the air channels 130, 214 formed between the circuit boards 120, 212 and the back plates 118, 218 of the high mount stop lamp 100 and the tail lamp 200 provide a passageway for heat to dissipate through. For example, the air channel 130 of the high mount stop lamp 100 of FIG. 1 provides a passageway for heat to flow through thereby uniformly distributing heat throughout the high mount stop lamp 100 resulting in an isothermal high mount stop lamp 100. The heat generated by the circuit board 120 and the single LESD 110 of the high mount stop lamp 100 can spread uniformly throughout the high mount stop lamp 100. The heat may travel to cooler areas of the high mount stop lamp 100 through the air channel 130. The air channel 214 of the tail lamp 200 illustrated in FIG. 2 operates in a similar fashion.

In another embodiment, the high mount stop lamp 100 and the tail lamp 200 include thermally dissipative material. For example, the back plate 118 of the high mount stop lamp 100 can be molded out of thermally conductive plastic that has a 100:1 conductivity as compared to conventional plastics. Conventional plastics cannot spread or dissipate heat, resulting in a localized hot spot. Thermally conductive plastics are composites that have a thermal conductivity of approximately 10–100 Watts/meter Kelvin (W/mK), whereas conventional plastics have a thermal conductivity of approximately 0.2 W/mK. Thermally conductive plastics also have a low Coefficient of Thermal Expansion (CTE). The low CTE allows use of injection-molded plastic components in conjunction with ceramics, silicon, and alloys within the high mount stop lamp 100. The low CTE reduces stress due to differential expansion within these materials, and reduces shrinkage in an injection-molding process. The thermal conductivity of the back plate 118 may dissipate the heat generated by the electrical components of the high mount stop lamp 100. The back plate 118 may be able to absorb heat and maintain an isothermal surface temperature.

The high mount stop lamp 100 and the tail lamp 200 may be injection-molded lighting devices and can be molded into any shape or configuration. Additionally, post-machining and assembly operations can generally be omitted when employing injection-molded lighting devices. As one example, a heat spreader may be added to the high mount stop lamp to dissipate heat from the single LESD 110. Thermally conductive plastic may be used to mold the heat spreader in order to spread heat throughout the high mount stop lamp, resulting in a more isothermal profile across the back plate 118.

In another embodiment, the high mount stop lamp 100 and the tail lamp 200 include thermally conductive elements. For example, the high mount stop lamp 100 includes the direct conducting stud bolt 114, which dissipates thermal energy to a surrounding environment resulting in a lower lamp temperature. Heat is conducted through the metal core base 112 of the single LESD 110 to the shoulder 116 of the stud bolt 114. The stud bolt 114 is in contact with an outer environment, and therefore transfer heat out of the high mount stop lamp 100 to the outer environment. The combination of the direct conducting stud bolt 114, and the thermally conductive material of the back plate 118 allow for the transfer of heat out of the high mount stop lamp 100, which results in lowering the lamp temperature, eliminating hot spots, decreasing a lamp distortion, and lowering operating temperatures.

In one embodiment, the high mount stop lamp 100 and the tail lamp 200 provide a lighting device with a light source comprising a single LESD lamp with a uniform lit and unlit appearance. For example, the lens 102 of the high mount stop lamp 100 illustrated in FIG. 1 obscures a view of inner components of the high mount stop lamp 100. The retroactive optics 104 aid to obscure the view of the single LESD 110. The lens 102 allows the ability to hide the single LESD 110 source from direct view thereby providing a clean unlit view and uniform lit view. The tail lamp 200 illustrated in FIG. 2 includes similar advantages.

The high mount stop lamp 100 and the tail lamp 200 include low profile designs (e.g., thin housings) that eliminate secondary stamping and an additional installation processes that can result in significant cost savings. For example, the high mount stop lamp 100 structure may be inserted into a recess of a vehicle and attached to the vehicle using a single mount location. The connectors 109(*a–b*) can locate a position of the high mount stop lamp 200 within the vehicle.

The high mount stop lamp 100 and the tail lamp 200 are illustrative embodiments of the present invention. Other exterior automotive lighting applications such as courtesy lamps, center high mount stop lamps, high level brake lamps, license plate number lamps, headlights, rear end and front end outline lamps, rear direction indicators, or turn signal indicators may also be used in accordance with embodiments of the present invention.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description. Consequently, modifications of structure, sequence, materials and the like apparent to those skilled in the art would still fall within the scope of the invention.

I claim:

1. A lighting device comprising:

a light guide having a first surface and a second surface;

a light source comprising a single Light Emitting Semiconductor Device (LESD), the single LESD coupled to the light guide to radiate light through the first surface;

a control circuit arranged within the light guide, the control circuit electrically coupled to the single LESD to control operation of the single LESD;

a back plate coupled to the light guide forming an air channel between the light guide and the back plate, the air channel dissipating heat generated by the single LESD and the control circuit; and a heat collector coupled to the light guide, the heat collector operable to dissipate heat generated by the single LESD and the control circuit.

2. The lighting device of claim 1, wherein the single LESD is a Light Emitting Diode (LED).

3. The lighting device of claim 1, wherein the single LESD is coupled to the light guide using a thermally conductive connector.

4. The lighting device of claim 3, wherein the heat collector includes the thermally conductive connector.

5. The lighting device of claim 1, wherein the first surface of the light guide is a light emitting surface comprising reflective optics.

6. The lighting device of claim 1, wherein the lighting device is selected from the group consisting of a tail light, a brake light, a turn light, a center high mount stop lamp, a high level brake lamp, a license plate number lamp, an outline lamp, a headlight, and a direction indicator.

7. The lighting device of claim 1, wherein the light guide includes a reflective material.

8. The lighting device of claim 1, wherein the light guide includes a thermally conductive material.

9. A method of managing heat generated within a lighting device, the method comprising:

providing a lighting device comprising a first surface and a second surface composed of a thermally conductive substrate material, the lighting device comprising:

a single Light Emitting Semiconductor Device (LESD) operable to radiate light; and a control circuit mounted between the first surface and the second surface of the lighting device, the control circuit electrically coupled to the single LESD to control operation of the single LESD;

providing an air channel between the first surface and the second surface of the lighting device; and transferring heat generated by the single LESD and the control circuit through the air channel of the lighting device thereby uniformly distributing heat throughout the lighting device.

10. The method of claim 9, wherein providing the lighting device comprises providing a device selected from the group consisting of a tail light, a brake light, a center high mount stop lamp, a high level brake lamp, a license plate number lamp, an outline lamp, a headlight, and a direction indicator.

11. The method of claim 9, wherein the single LESD is a Light Emitting Diode (LED).

12. The method of claim 9, wherein the single LESD is coupled to the lighting device using a thermally conductive connector.

13. The method of claim 12 further comprising the step of transferring heat generated by the single LESD and the control circuit away from the lighting device through the thermally conductive connector.

14. An exterior vehicle lamp comprising:

a lens and a reflector coupled together comprising a light guide;

a single Light Emitting Semiconductor Device (LESD) operable to radiate light mounted within the light guide; and a back plate coupled to the light guide forming an air channel between the light guide and the back plate, wherein the single LESD is mounted within the light guide using a thermally conductive connector, the thermally conductive connector and the air channel operable to dissipate heat generated by the single LESD.

15. The lamp of claim 14 further comprising an air channel within the light guide, wherein heat generated by the single LESD is transferred through the air channel thereby uniformly distributing heat throughout the tail lamp.

16. The lamp of claim 14, wherein the light guide shields the view of the single LESD.

17. The lamp of claim 14, wherein the single LESD is mounted on a metal core base comprising a thermally conductive material.

18. The lamp of claim 14, wherein the single LESD is a Light Emitting Diode.

19. The lamp of claim 14 further comprising:

a control circuit conductively coupled to the single LESD, the control circuit mounted between the back plate and the light guide, wherein heat generated by the single LESD and the control circuit is transferred through the air channel thereby uniformly distributing heat throughout the tail lamp.

* * * * *